United States Patent
Mizutani

(10) Patent No.: US 8,823,964 B2
(45) Date of Patent: Sep. 2, 2014

(54) CONTROL DEVICE FOR CAUSING A PRINT EXECUTION UNIT TO EXECUTE PRINTING

(71) Applicant: Norio Mizutani, Mie-ken (JP)

(72) Inventor: Norio Mizutani, Mie-ken (JP)

(73) Assignee: Brother Kogyo Kabushiki Kaisha, Nagoya, Aichi (JP)

(*) Notice: Subject to any disclaimer, the term of this patent is extended or adjusted under 35 U.S.C. 154(b) by 0 days.

(21) Appl. No.: 13/849,840

(22) Filed: Mar. 25, 2013

(65) Prior Publication Data

US 2013/0335763 A1    Dec. 19, 2013

(30) Foreign Application Priority Data

Jun. 18, 2012    (JP) .................. 2012-137053

(51) Int. Cl.
*G06F 3/12*    (2006.01)
*G06K 15/00*   (2006.01)
*H04N 1/00*    (2006.01)
*G06K 15/02*   (2006.01)

(52) U.S. Cl.
CPC .......... *G06F 3/1298* (2013.01); *G06K 15/1859* (2013.01)
USPC .......... 358/1.13; 358/1.1; 358/1.14; 358/1.15; 358/405

(58) Field of Classification Search
USPC ........ 358/1.13, 1.14, 1.1, 1.15, 444, 405, 1.9, 358/501, 508, 537, 401; 709/200, 203, 213, 709/218, 250, 217, 201, 212, 238, 246
See application file for complete search history.

(56) References Cited

U.S. PATENT DOCUMENTS

2011/0069344 A1*    3/2011    Yokomizo .................... 358/1.15
2012/0069390 A1*    3/2012    Saito et al. .................... 358/1.15

FOREIGN PATENT DOCUMENTS

| JP | 2008-288733 A | 11/2008 |
|----|---------------|---------|
| JP | 2011-065595 A | 3/2011  |
| JP | 2011-245720 A | 12/2011 |

* cited by examiner

*Primary Examiner* — Ngon Nguyen
(74) *Attorney, Agent, or Firm* — Scully, Scott, Murphy & Presser, PC

(57) ABSTRACT

A control device may execute a first type of transformation process for each of a plurality of partial target data sequentially, so as to try to generate each of a plurality of partial print data sequentially. The control device may send second partial target data to a server via a network, in a first case where the first type of transformation process for the second partial target data does not succeed after the first type of transformation process for first partial target data succeeded and first partial print data was generated. The control device may receive first transformed data from the server via the network in the first case. The control device may supply second partial print data obtained by using the first transformed data to a print execution unit in the first case.

9 Claims, 10 Drawing Sheets

CONTROL DEVICE FOR CAUSING A PRINT EXECUTION UNIT TO EXECUTE PRINTING

CROSS-REFERENCE TO RELATED APPLICATION

This application claims priority to Japanese Patent Application No. 2012-137053, filed on Jun. 18, 2012, the contents of which are hereby incorporated by reference into the present application.

TECHNICAL FIELD

This specification discloses a control device for causing a print execution unit to execute printing.

DESCRIPTION OF RELATED ART

The technique that a printer stores a plurality of files is known. A user selects a printing target file among the plurality of files in the printer by using a PC. The PC determines whether the printer can interpret the format of the selected file. When it is determined that the printer can interpret the format of the selected file, the PC sends a file path of the selected file to the printer and instructs the printer to execute printing. On the other hand, when it is determined that the printer cannot interpret the format of the selected file, the PC transforms the selected file into data having such a format that the printer can interpret, sends the data to the printer, and instructs the printer to execute printing.

BRIEF SUMMARY

This specification provides a technique capable of causing a print execution unit to appropriately execute printing using a method different from the above technique.

One aspect disclosed in the present specification may be a control device for causing a print execution unit to execute printing. The control device may comprise: a processor; and a memory storing computer-readable instructions therein. The memory may store computer-readable instructions. The computer-readable instructions, when executed by the processor, may cause the control device to perform: preparing, a plurality of partial print data by using target data, the plurality of partial print data corresponding to a plurality of pages, the target data including a plurality of partial target data corresponding to the plurality of pages; and supplying each of the plurality of partial print data to the print execution unit sequentially. The preparing may include: executing a first type of transformation process for each of the plurality of partial target data sequentially, so as to try to generate each of the plurality of partial print data sequentially; sending second partial target data to a server via a network, in a first case where the first type of transformation process for the second partial target data does not succeed after the first type of transformation process for first partial target data succeeded and first partial print data was generated, the first partial target data being data for which the first type of transformation process is to be executed firstly among the plurality of partial target data, the second partial target data being data for which the first type of transformation process is to be executed after the first partial target data among the plurality of partial target data; and receiving first transformed data from the server via the network in the first case, the first transformed data being data generated by the server executing a second type of transformation process for the second partial target data; wherein the supplying includes supplying second partial print data to the print execution unit in the first case, the second partial print data being data obtained by using the first transformed data.

A control method, a computer program, and a non-transitory computer-readable recording medium storing the computer program for realizing the control device are also new and useful. Further, a system that includes the control device and the server is also new and useful.

EMBODIMENT

First Embodiment

Configuration of Communication System 2

Figure 1:
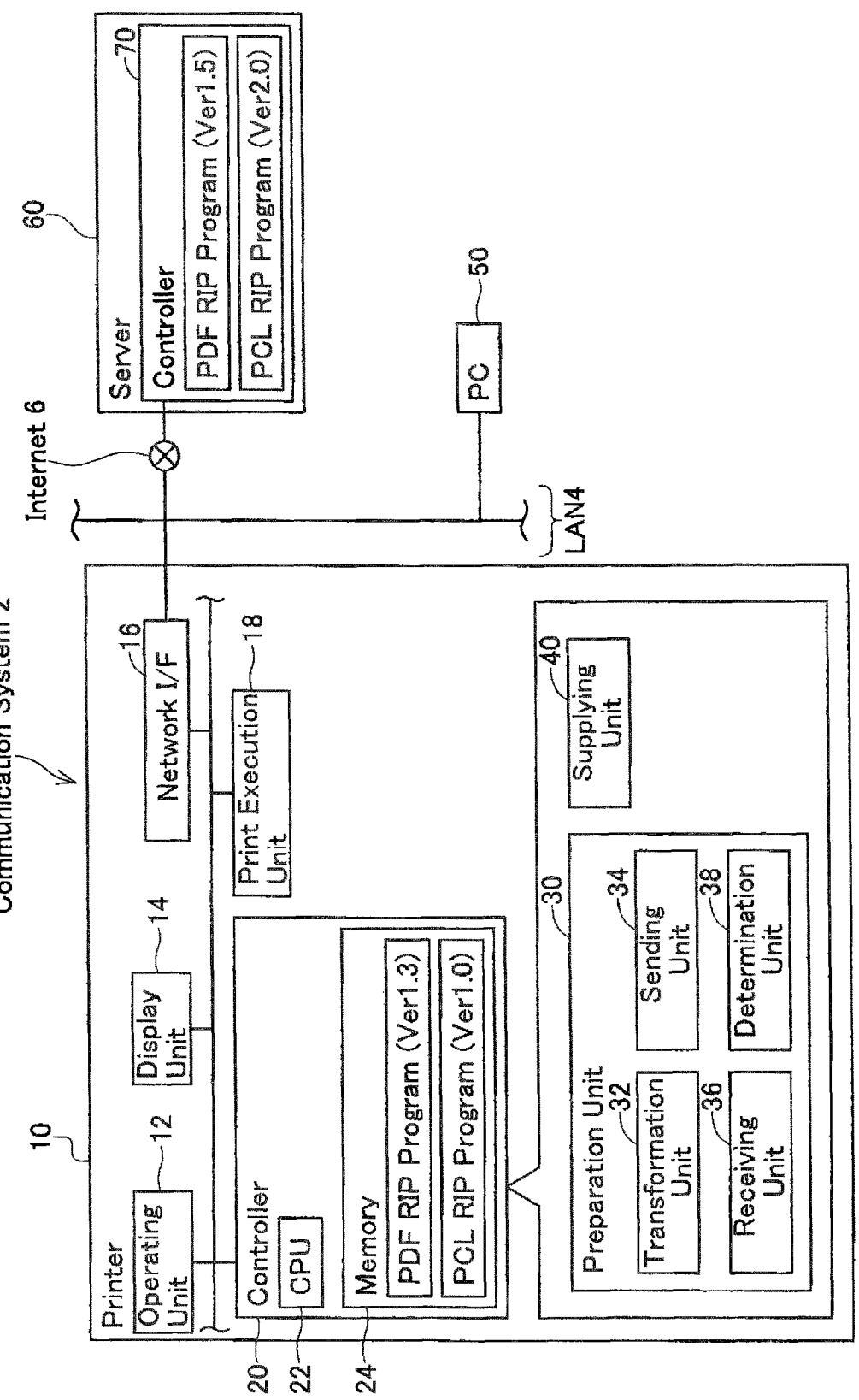
FIG. 1 shows a configuration of a communication system.

As shown in FIG. 1, a communication system 2 includes a printer 10, a PC 50, and a server 60. The printer 10 and the PC 50 are connected to a LAN 4. Thus, the printer 10 and the PC 50 can communicate with each other via the LAN 4. The server 60 is connected to the Internet 6. Thus, the printer 10 and the server 60 can communicate with each other via the LAN 4 and the Internet 6.

(Configuration of Printer 10)

The printer 10 includes an operating unit 12, a display unit 14, a network interface 16, a print execution unit 18, and a controller 20. The operating unit 12 includes a plurality of keys. The user can input various instructions, information, and the like to the printer 10 by operating the operating unit 12. The display unit 14 is a display for displaying various items of information. The network interface 16 is connected to the LAN 4. The print execution unit 18 is a mechanism for executing printing mechanism according to an ink jet printing method, a laser printing method, or the like. Upon receiving print data described later from the controller 20, the print execution unit 18 executes printing on a printing medium according to the print data.

The controller 20 includes a CPU 22 and a memory 24. The CPU 22 executes various processes according to a plurality of programs stored in the memory 24. When the CPU 22 executes various processes, the functions of a preparation unit 30 and a supplying unit 40 are realized. The preparation unit 30 includes a transformation unit 32, a sending unit 34, a receiving unit 36, and a determination unit 38. The memory 24 includes a ROM, a RAM, a hard disk, and the like. The memory 24 stores a plurality of programs executed by the CPU 22. FIG. 1 shows a raster image process (RIP) program which is part of the plurality of programs.

The RIP program is a program for executing a RIP process. The RIP process is a data transformation process for page description language (PDL) data and is a process for generating print data from the PDL data. The PDL data includes all types of data that uses the page concept, and in this embodiment, includes portable document format (PDF) data and printer control language (PCL) data.

The PDL data may include vector data and may include multilevel (for example, 256-level) bitmap data. On the other hand, the print data is bitmap data having a relatively small level such as 2-level or 3-level, for example. For example, in the RIP process, first, multilevel RGB bitmap data is generated from PDL data. Subsequently, multilevel CMYK bitmap data is generated from the multilevel RGB bitmap data. After that, CMYK bitmap data having a relatively small level such as 2-level (dots and no dots) or 3-level (large dots, small dots, and no dots) is generated from the multilevel CMYK bitmap data. The CMYK bitmap data generated in this manner is print data.

As described above, upon receiving print data from the controller 20, the print execution unit 18 executes printing on a printing medium according to the print data. That is, the print data (that is, partial print data described later) is data that the print execution unit 18 can process. In contrast, the PDL data is data that the print execution unit 18 cannot process.

A PDF RIP program and a PCL RIP program in the memory 24 of the printer 10 are programs for executing a RIP process of generating print data from PDL data having PDF and PCL data formats, respectively. The PDF RIP program and the PCL RIP program in the memory 24 have program versions "ver1.3" and "ver1.0," respectively.

Since the memory 24 of the printer 10 stores the PDF RIP program and the PCL RIP program, the controller 20 of the printer 10 can execute a RIP process for PDL data having the PDF data format and a RIP process for PDL data having the PCL data format. However, the memory 24 may store a RIP program for executing a RIP process for PDL data having another data format. For example, the memory 24 may store a tagged image file format (TIFF) RIP program for executing a RIP process for TIFF data, an XML paper specification (XPS) RIP program for executing a RIP process for XPS data, a post script (PS) RIP program for executing a RIP process PS data, and the like.

Although not shown in the figure, the memory 24 further stores rule information for identifying a data format (that is, a file format of a PDL file) of PDL data. The rule information is used for identifying data format in step S10 described later of FIG. 2. For example, PDF files generally have a structure in which a character string "% PDF" is described at the start of the file and a rendering command is described after that. Thus, the starting 4-byte word of PDL data of which the data format is to be identified is "% PDF," the rule information includes PDL rule information for identifying that the data format of the target PDL data is PDF. Moreover, the rule information includes PCL rule information for identifying that the data format of target PDL data is PCL.

(Configuration of Server 60)

The server 60 is a server provided by the vender of the printer 10. The server 60 includes a controller 70. The controller 70 includes a CPU and a memory which are not shown. The memory of the server 60 stores a PDF RIP program and a PCL RIP program. Thus, the controller 70 of the server 60 can execute a RIP process for PDL data having a PDF data format and a RIP process for PDL data having a PCL data format. The memory of the server 60 further stores the above rule information similarly to the printer 10.

The administrator (that is, the vender of the printer 10) of the server 60 stores a RIP program of the latest version as perceived by the administrator in the memory of the server 60. Specifically, the PDF RIP program and the PCL RIP program in the memory of the server 60 have program versions "ver1.5" and "ver2.0," respectively. The program version "ver1.5" of the PDF RIP program in the memory of the server 60 is newer than the program version "ver1.3" of the PDF RIP program in the memory 24 of the printer 10. Moreover, the program version "ver2.0" of the PCL RIP program in the memory of the server 60 is newer than the program version "ver1.0" of the PCL RIP program in the memory 24 of the printer 10. A RIP program having a newer version supports a larger number of commands (in other words, can interpret a larger number of commands and execute the RIP process) as compared to a RIP program having an older version. For example, a PDF RIP program having the program version "ver1.3" does not support a rendering command for transparency processing included in a PDF file and a rendering command based on the Joint Photographic Experts Group (JPEG) 2000, whereas a PDF RIP program having the program version "ver1.5" supports these rendering commands.

Figure 2:
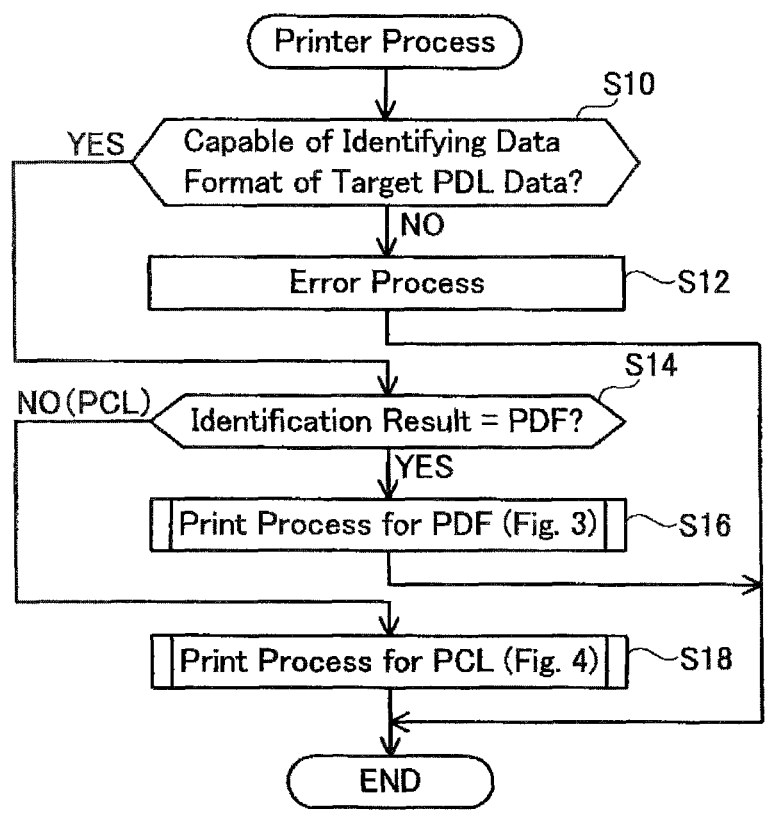
FIG. 2 shows a flowchart of a printer process.

(Process (Printer Process) Executed by Printer 10: FIG. 2)

Next, the content of a process executed by the controller 20 of the printer 10 will be described with reference to FIG. 2. Although not illustrated in the flowchart of FIG. 2, the controller 20 performs monitoring to check whether printing target PDL data (that is, one printing target file) is acquired from an external device (for example, the PC 50) via the LAN 4. For example, the user of the PC 50 designates target PDL data (for example, a PDF file, a PCL file, or the like) and inputs an instruction for supplying the PDL data to the printer 10 to the PC 50. In this case, the PC 50 supplies the PDL data to the printer 10 via the LAN 4. The PC 50 also supplies print condition data (for example, data indicating a printing resolution, a paper size, a paper type, and the like) to the printer 10 together with the PDL data. Upon receiving the PDL data and the print condition data, the controller 20 of the printer 10 starts the process of FIG. 2. In the following description, the PDL data that the printer 10 acquires from the external device will be referred to as "target PDL data."

In the following description, a case where the target PDL data includes a plurality of pages of data will be described as an example. Further, in the following description, one page of data will be referred to as "one partial PDL data." Thus, target PDL data (that is, one printing target file) includes a plurality of items of partial PDL data corresponding to the plurality of pages. Further, in the following description, partial PDL data having the PDF data format and partial PDL data having the PCL data format may sometimes be represented by "partial PDL data (PDF)" and "partial PDL data (PCL)," respectively.

In step S10, the determination unit 38 determines whether the data format of target PDL data can be identified by using the rule information in the memory 24. Specifically, first, the determination unit 38 determines whether the data format of the target PDL data is PDF by using PDF rule information. When it is determined that the data format of the target PDL data is not PDF, the determination unit 38 further determines whether the data format of the target PDL data is PCL by using PCL rule information. When the determination unit 38 determines that the data format of the target PDL data is not PDF or PCL, that is, when the data format of the target PDL data cannot be identified, a determination result of "NO" is obtained in step S10, and the flow proceeds to step S12. On the other hand, when the determination unit 38 determines that the data format of the target PDL data is PDF or PCL, that is, when the data format of the target PDL data can be identified, a determination result of "YES" is obtained in step S10, and the flow proceeds to step S14.

In step S12, the controller 20 executes an error process without executing the processes of steps S14 to S18 (that is, without preparing print data). Specifically, the controller 20 displays error information on the display unit 14 to indicate that printing cannot be executed. Moreover, the controller 20 sends the error information to the external device (for example, the PC 50) that sent the target PDL data, via the LAN 4. Thus, the user of the external device can understand that printing cannot be executed. When the process of step S12 ends, the printer process of FIG. 2 ends.

In step S14, the controller 20 determines whether the identification result in step S10 is PDF or PCL. When the identification result in step S10 is PDF, a determination result of "YES" is obtained in step S14, and the controller 20 executes a PDF print process of step S16. On the other hand, when the identification result in step S10 is PCL, a determination result of "NO" is obtained in step S14, and the controller 20 executes a PCL print process of step S18. In step S16 or S18 which will be described in detail later, the preparation unit 30 prepares a plurality of items of partial print data corresponding to a plurality of pages by using the target PDL data including a plurality of items of partial PDL data corresponding to the plurality of pages. In step S16 or S18, the supplying unit 40 sequentially supplies the plurality of items of partial print data to the print execution unit 18. When the process of step S16 or S18 ends, the printer process of FIG. 2 ends.

Figure 3:
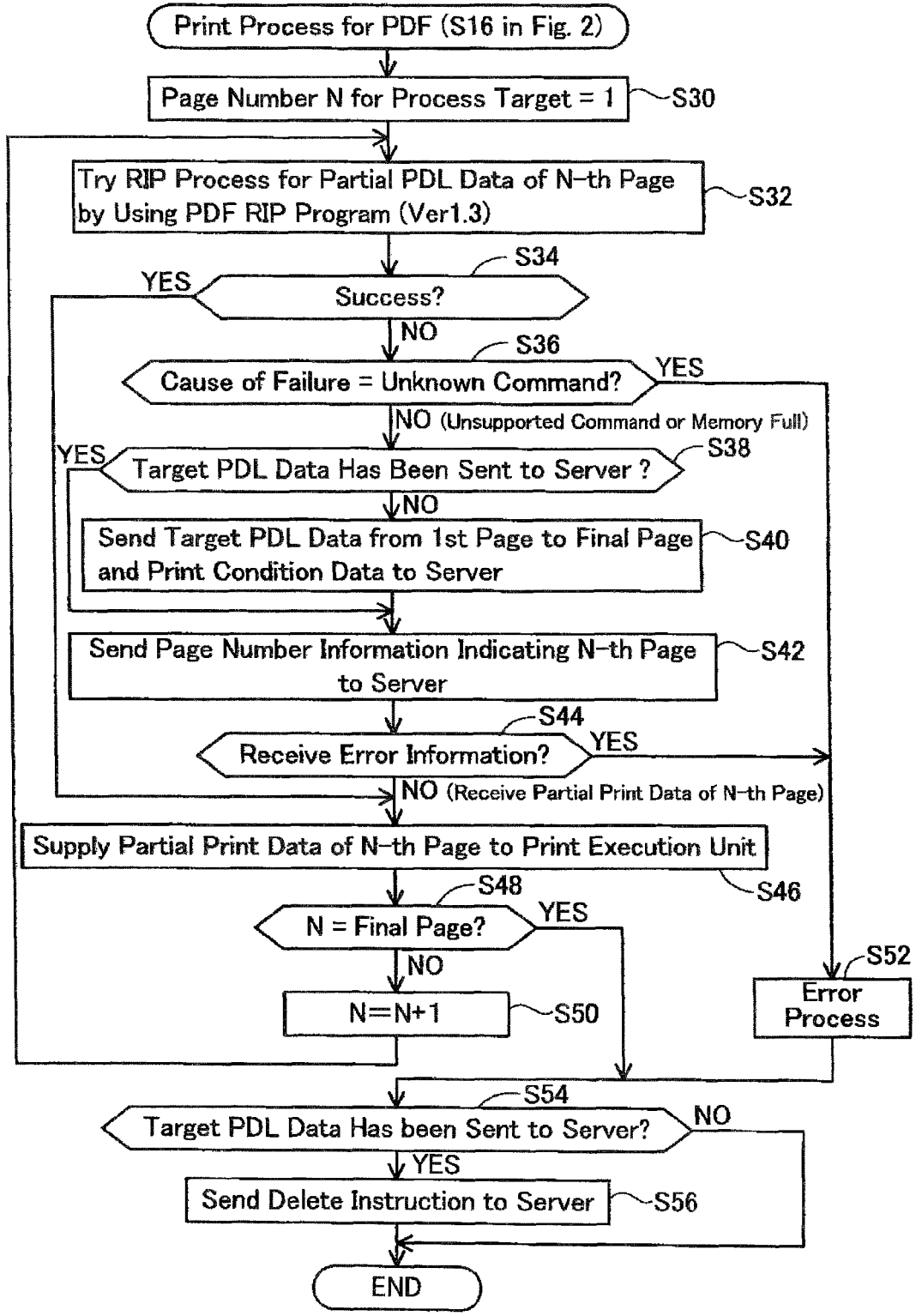
FIG. 3 shows a flowchart of a PDF print process.

(PDF Print Process: FIG. 3)

Next, the content of the PDF print process of step S16 of FIG. 2 will be described with reference to FIG. 3. In step S30, the preparation unit 30 determines "1" as a processing target page number N. Subsequently, in step S32, the transformation unit 32 executes a RIP process for partial PDL data (PDF) of an N-th page (for example, the first page) among the plurality of items of partial PDL data according to the PDF RIP program having "ver1.3" in the memory 24 to try to generate partial print data of the N-th page. In step S32, the transformation unit 32 tries to generate partial print data of the N-th page that meets the print condition that is indicated by the print condition data acquired from the external device. For example, the transformation unit 32 tries to generate partial print data of the N-th page having a printing resolution that is indicated by the print condition data. Moreover, for example, the transformation unit 32 tries to generate partial print data of the N-th page having a size corresponding to a paper size that is indicated by the print condition data.

As described above, the PDF RIP program having the program version "ver1.3" does not support a rendering command for transparency processing and a rendering command based on the JPEG 2000. Thus, when the partial PDL data (PDF) of the N-th page includes these rendering commands, the transformation unit 32 cannot generate the partial print data of the N-th page (that is, the RIP process fails). However, the PDF RIP program having the program version "ver1.3" can identify the types of these rendering commands. In the following description, the rendering commands (for example, rendering commands for transparency processing and rendering commands based on the JPEG 2000) which are not supported by the RIP program (for example, the PDF RIP program having the program version "ver1.3") in the memory 24 of the printer 10 and of which the types can be identified by the RIP program will be referred to as "unsupported commands."

Further, for example, the partial PDL data (PDF) of the N-th page may include rendering commands which are not supported by the PDF RIP program having the program version "ver1.3" and which are different from the unsupported commands (that is, rendering commands of which the types cannot be identified). An example of such rendering commands is a rendering command that is not defined in the PDL specification. In this case, the transformation unit 32 cannot generate the partial print data of the N-th page (that is, the RIP process fails). In the following description, rendering commands which are not supported by the RIP program (for example, the PDF RIP program having the program version "ver1.3") in the memory 24 of the printer 10 and of which the types cannot be identified by the RIP program will be referred to as "unknown commands."

Moreover, the transformation unit 32 executes the RIP process for the partial PDL data (PDF) of the N-th page using a predetermined area in the memory 24 of the printer 10. In this case, there is a possibility that an empty space of the predetermined area is insufficient, that is, a memory full error may occur. In this case, the transformation unit 32 cannot generate the partial print data of the N-th page (that is, the RIP process fails).

In step S34, the preparation unit 30 determines whether the RIP process of step S32 has succeeded, that is, whether the partial print data of the N-th page has been generated. When it is determined that the RIP process has succeeded (step S34: YES), the flow proceeds to step S46. When it is determined that the RIP process failed (step S34: NO), the flow proceeds to step S36.

In step S36, the preparation unit 30 determines whether the cause of the failed RIP process is an unknown command that is included in the partial PDL data of the N-th page. When it is determined that the unknown command included in the partial PDL data of the N-th page is the cause of the failure (step S36: YES), the flow proceeds to step S52. When it is determined that an unsupported command included in the partial PDL data of the N-th page is the cause of the failure (step S36: NO), or that the occurrence of a memory full error is the cause of the failure (step S36: NO), the flow proceeds to step S38.

In step S38, the preparation unit 30 determines whether the target PDL data has been sent to the server 60, that is whether the process of step S40 described later has been executed once. When it is determined that the target PDL data has been sent to the server 60 (step S38: YES), the flow proceeds to step S42 by skipping step S40. When it is determined that the target PDL data has not been sent to the server 60 (step S38: NO), the flow proceeds to step S40.

In step S40, the sending unit 34 sends all of the plurality of items of partial PDL data (PDF) included in the target PDL data (that is, respective items of partial PDL data (PDF) of the first to final pages) to the server 60 via the LAN 4 and the Internet 6. In step S40, the sending unit 34 further sends the print condition data acquired from the external device to the server 60 together with the target PDL data.

In step S42, the sending unit 34 sends page number information that indicates the N-th page (for example, the first page) to the server 60 via the LAN 4 and the Internet 6. When the page number information is sent to the server 60 in step S42, the server 60 executes a process according to the flowchart of FIG. 5 described later to send the partial print data (S122 of FIG. 5) of the N-th page or the error information (S124 of FIG. 5) to the printer 10. As a result, the receiving unit 36 receives the partial print data of the N-th page or the error information from the server 60 via the LAN 4 and the Internet 6.

In step S44, the preparation unit 30 determines whether the error information or the partial print data of the N-th page has been received from the server 60. When it is determined that the error information has been received (step S44: YES), the flow proceeds to step S52. When it is determined that the partial print data of the N-th page has been received (step S44: NO), the flow proceeds to step S46.

In step S46, the supplying unit 40 supplies the partial print data of the N-th page to the print execution unit 18. For example, in step S46 which is executed in the case of "YES" in step S34, the supplying unit 40 supplies the partial print data of the N-th page generated in the RIP process of step S32, that is the partial print data of the N-th page prepared by the transformation unit 32, to the print execution unit 18. Moreover, in step S46 which is executed in the case of "NO" in step S44, the supplying unit 40 supplies the partial print data of the N-th page received from the server 60 (that is the partial print data of the N-th page prepared by the sending unit 34 and the receiving unit 36) to the print execution unit 18. Since the data (that is, the partial print data of the N-th page) received from the server 60 is data that the print execution unit 18 can process, the controller 20 can supply the data (that is, the partial print data of the N-th page) to the print execution unit 18 without executing a further transformation process on the data received from the server 60. When step S46 is executed, the print execution unit 18 executes printing on a printing medium according to the partial print data of the N-th page.

In step S48, the preparation unit 30 determines whether the current processing target page number N is a page number of the final page included in the target PDL data. When it is determined that the current N is the page number of the final page (step S48: YES), the flow proceeds to step S54. When it is determined that the current N is not the page number of the final page (step S48: NO), the flow proceeds to step S50.

In step S50, the preparation unit 30 adds "1" to the current N (for example, 1) to determine a new N (for example, 2). When the process of step S50 ends, the flow returns to step S32, and the transformation unit 32 executes the RIP process for the partial PDL data (PDF) of the N-th page (for example, the second page) as specified by the new N to try to generate partial print data of the N-th page.

In step S52, the controller 20 executes an error process. The process of step S52 is the same as the process of step S12 of FIG. 2. When the process of step S52 ends, the flow proceeds to step S54.

In step S54, the controller 20 determines whether the target PDL data has been sent to the server 60 (that is, whether the process of step S40 has been executed). When it is determined that the target PDL data has been sent to the server 60 (step S54: YES), the flow proceeds to step S56. When it is determined that the target PDL data has not been sent to the server 60 (step S54: NO), the process of FIG. 3 ends while skipping step S56.

In step S56, the controller 20 sends a delete instruction for deleting the target PDL data from the memory in the server 60 to the server 60 via the LAN 4 and the Internet 6. As a result, in step S128 of FIG. 5 described later, the target PDL data is deleted from the memory in the server 60. When the process of step S56 ends, the process of FIG. 3 ends.

As described above, in the PDF print process of FIG. 3, when the RIP process for the partial PDL data (PDF) of the N-th page fails, the printer 10 sends all items of target PDL data including the partial PDL data (PDF) of the N-th page to the server 60. Due to this, the server 60 generally executes the RIP process for the partial PDL data (PDF) of the N-th page on behalf of the printer 10 to generate the partial print data of the N-th page. As a result, the printer 10 can receive the partial print data of the N-th page from the server 60 and supply the partial print data of the N-th page to the print execution unit 18.

In step S40, a configuration in which the sending unit 34 sends only the partial PDL data (PDF) of the N-th page to the server 60 rather than sending the partial PDL data of the first to final pages to the server 60 may be taken into consideration. However, in the process of FIG. 3, since the data format of the target PDL data is PDF, it is difficult to extract only the partial PDL data (PDF) of the N-th page due to the structure of PDF files. Thus, in step S40 of FIG. 3, the sending unit 34 sends all items of target data including the respective items of partial PDL data of the first to N-th pages (that is, all items of partial PDL data of the first to final pages) to the server 60. Thus, the server 60 can appropriately execute the RIP process for the partial PDL data (PDF) of the N-th page using the respective items of partial PDL data (PDF) of the first to N-th pages.

As for PCL data, only the partial PDL data (PCL) of the N-th page can be extracted. Thus, in the PCL print process of FIG. 4 described later, a configuration in which when the RIP process for the partial PDL data (PCL) of the N-th page fails, only the partial PDL data (PCL) of the N-th page is sent to the server 60 is employed (see step S80 of FIG. 4).

Figure 4:
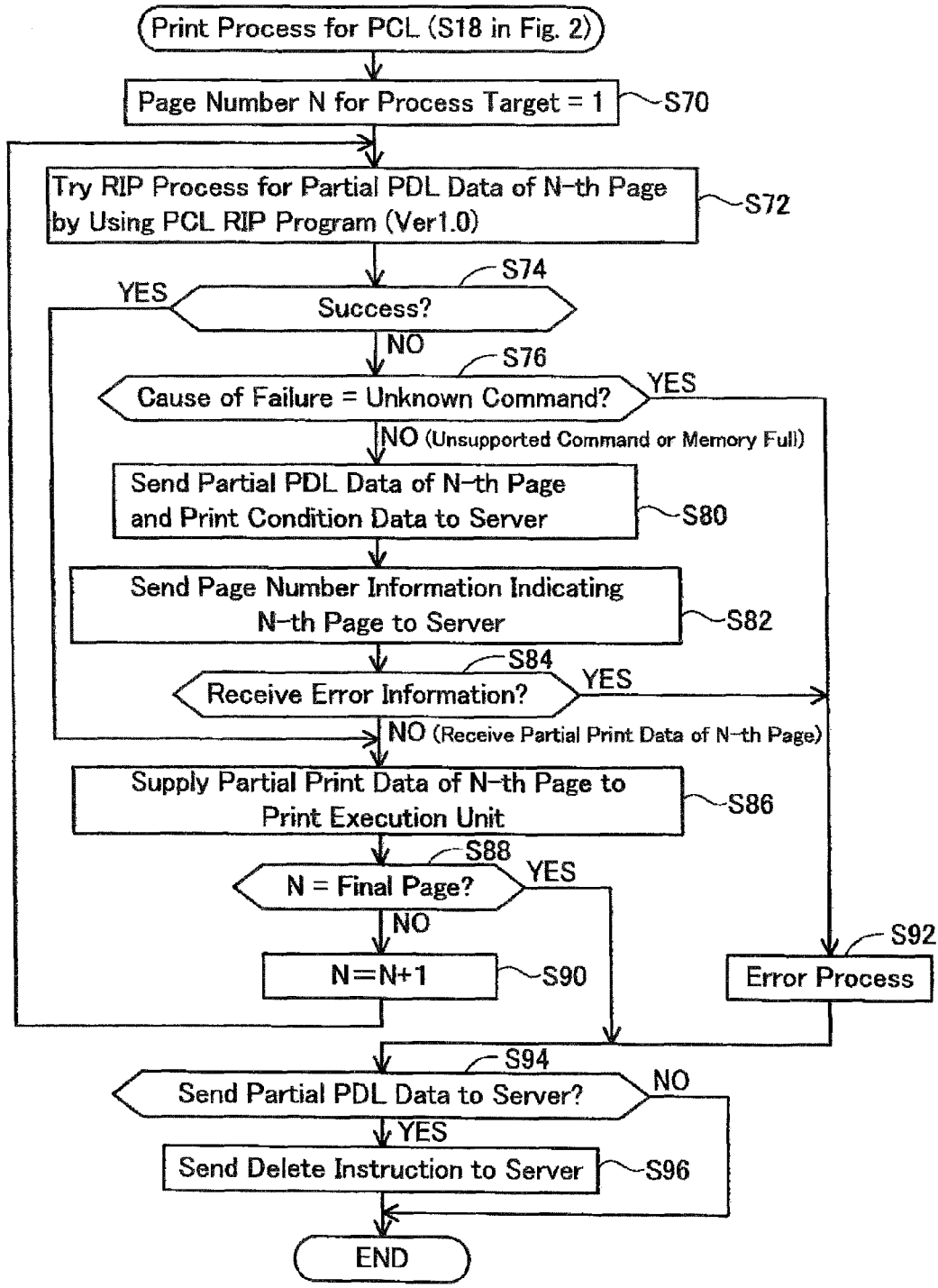
FIG. 4 shows a flowchart of a PCL print process.

(PCL Print Process: FIG. 4)

Subsequently, the content of the PCL print process of step S18 of FIG. 2 will be described with reference to FIG. 4. The process of step S70 is the same as that of step S30 of FIG. 3. The process of step S72 is the same as that of step S32 of FIG. 3 except that the PCL RIP program having the program version "ver1.0" is used. The processes of steps S74 and S76 are the same as those of steps S34 and S36 of FIG. 3, respectively.

In the case of "NO" in step S76, in step S80, the sending unit 34 sends only the partial PDL data (PCL) of the N-th page among the plurality of items of partial PDL data included in the target PDL data to the server 60. This is different from step S40 of FIG. 3. The processes of steps S82 to S96 are the same as those of steps S42 to S56 of FIG. 3.

As described above, in the PCL print process of FIG. 4, when the RIP process for the partial PDL data (PCL) of the N-th page fails, the printer 10 sends the partial PDL data (PCL) of the N-th page to the server 60. Due to this, the server 60 generally executes the RIP process for the partial PDL data (PCL) of the N-th page on behalf of the printer 10 to generate the partial print data of the N-th page. As a result, the printer 10 can receive the partial print data of the N-th page from the server 60 and supply the partial print data of the N-th page to the print execution unit 18. In particular, in this embodiment, in step S80, it is possible to reduce a communication load of the network (the LAN 4 and the like) and a processing load of the printer 10 and/or the server 60 as compared to a configuration in which all items of target data are sent to the server 60 with the aim to send only the partial PDL data (PCL) of the N-th page to the server 60.

Figure 5:
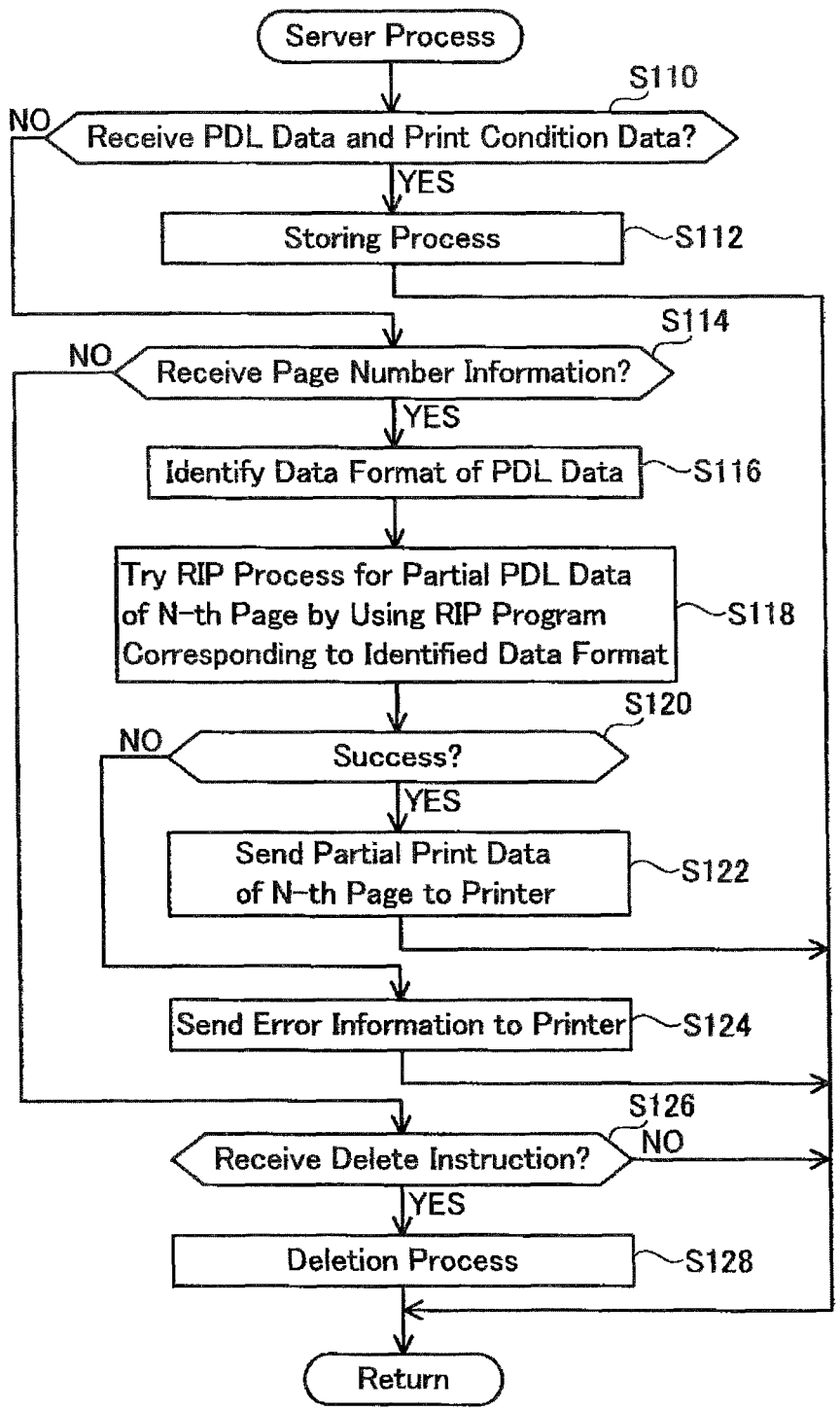
FIG. 5 shows a flowchart of a server process.

(Process (Server Process) Executed by Server 60: FIG. 5)

Subsequently, the content of the process executed by the controller 70 of the server 60 will be described with reference to FIG. 5. In step S110, the controller 70 performs monitoring to check whether PDL data and print condition data are received from the printer 10. When the process of step S40 of FIG. 3 is executed, all items of target PDL data are received from the printer 10. When the process of step S80 of FIG. 4 is executed, only the partial PDL data of the N-th page is received from the printer 10. When the PDL data and the print condition data are received from the printer 10 (step S110: YES), the flow proceeds to step S112.

In step S112, the controller 70 stores the PDL data (that is, all items of target PDL data or the partial PDL data of the N-th page) received in step S110 in the memory of the server 60. When the process of step S112 ends, the flow returns to step S110.

In step S114, the controller 70 performs monitoring to check whether the page number information (see step S42 of FIG. 3 and step S82 of FIG. 4) is received from the printer 10. When the page number information (that is, the processing target page number N) is received from the printer 10 (step S114: YES), the flow proceeds to step S116.

In step S116, the controller 70 identifies the data format (that is, PDF or PCL) of the PDL data stored in the memory of the server 60 in step S112 using the rule information in the memory of the server 60. Subsequently, in step S118, the controller 70 executes the RIP process for the partial PDL data of the N-th page specified by the page number information received in step S114 according to the RIP program corresponding to the identified data format to try to generate the partial print data of the N-th page. For example, when the identified data format is PDF, the controller 70 executes the RIP process for the partial PDL data (PDF) of the N-th page according to the PDF RIP program having the program version "ver1.5." Moreover, for example, when the identified data format is PCL, the controller 70 executes the RIP process for the partial PDL data (PCL) of the N-th page according to the PCL RIP program having the program version "ver2.0."

As described above, the program version "ver1.5" of the PDF RIP program stored in the memory of the server 60 is newer than the program version "ver1.3" of the PDF RIP program stored in the memory 24 of the printer 10 (that is, the PDF RIP program of the server 60 can appropriately process commands that the PDF RIP program of the printer 10 cannot process). The controller 70 executes the RIP process according to a RIP program having a program version that is newer than the RIP program in the memory 24 of the printer 10. Thus, even when the RIP process of the printer 10 fails due to the unsupported command included in the partial PDL data of the N-th page, in general, the controller 70 can appropriately generate the partial print data of the N-th page (that is, in general, the RIP process has succeeded). Moreover, the storage capacity of the memory of the server 60 is generally larger than the storage capacity of the memory 24 of the printer 10. Thus, even when the RIP process of the printer 10 fails due to the occurrence of a memory full error, in general, the controller 70 can appropriately generate the partial print data of the N-th page (that is, in general, the RIP process has succeeded).

Subsequently, in step S120, the controller 70 determines whether the RIP process of step S118 has succeeded. When it is determined that the RIP process has succeeded (step S120: YES), the flow proceeds to step S122. When it is determined that the RIP process failed (step S120: NO), the flow proceeds to step S124. An example of the cause of the failure of the RIP process is a memory full error that occurs in the server 60 because the server 60 is executing a number of printer processes.

In step S122, the controller 70 sends the generated partial print data of the N-th page to the printer 10. Moreover, in step S124, the controller 70 sends error information to the printer 10 to indicate that the RIP process failed. When the process of step S122 or S124 ends, the flow returns to step S110.

In step S126, the controller 70 performs monitoring to check whether the delete instruction (see step S56 of FIG. 3 and step S96 of FIG. 4) is received from the printer 10. When the delete instruction is received from the printer 10 (step S126: YES), the flow proceeds to step S128. In step S128, the controller 70 deletes the PDL data that is stored in the memory of the server 60 in step S112. When the process of step S128 ends, the flow returns to step S110.

Figure 6:
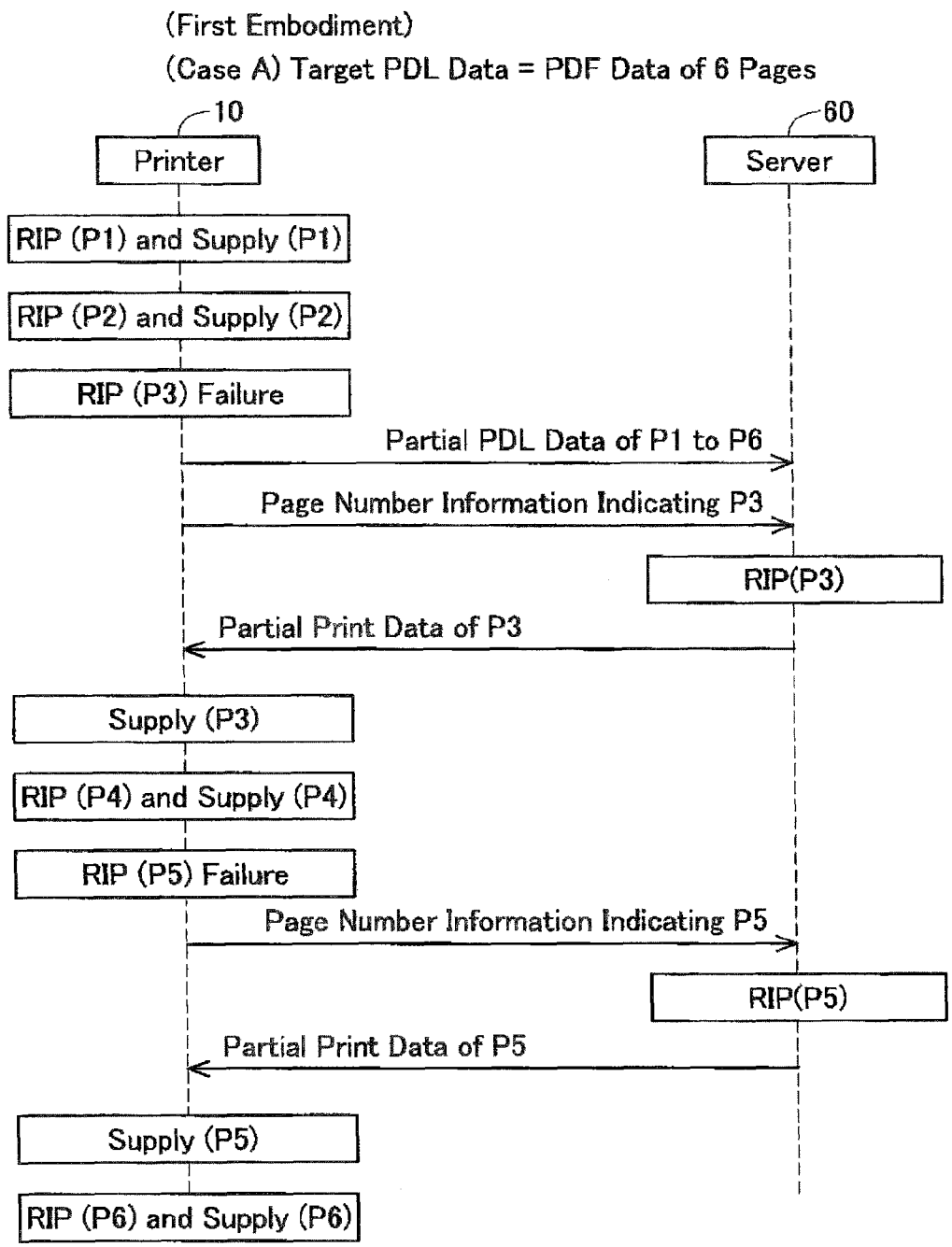
FIG. 6 shows a sequence diagram for Case A of a first embodiment.
Figure 7:
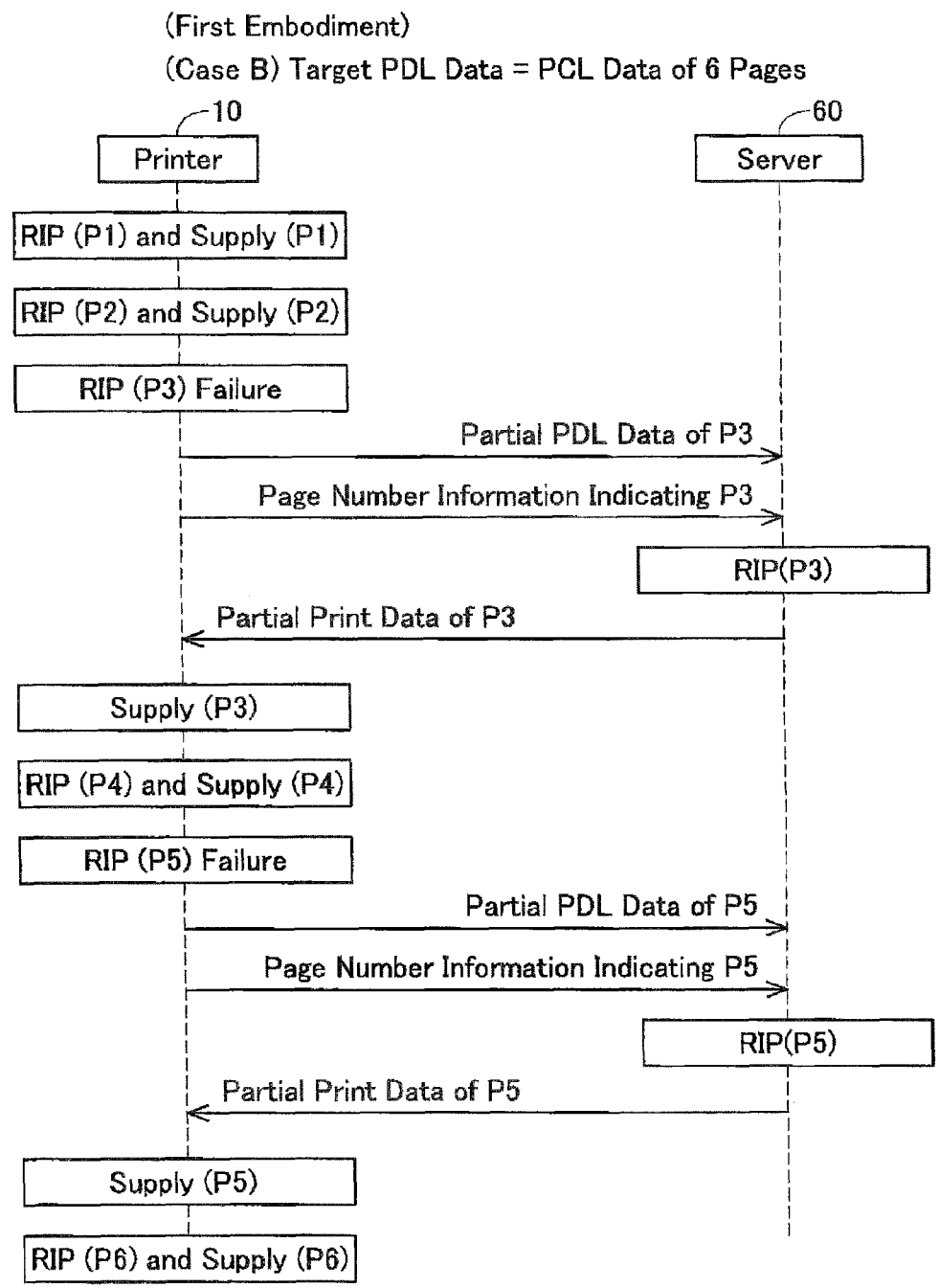
FIG. 7 shows a sequence diagram for Case B of the first embodiment.

(Specific Case: FIGS. 6 and 7)

Next, specific cases realized according to the flowcharts of FIGS. 2 to 5 will be described with reference to FIGS. 6 and 7. FIGS. 6 and 7 show sequence diagrams of the processes executed by the printer 10 and the server 60. In FIGS. 6 and 7, RIP (P1), RIP (P2), and the like indicate executing the RIP processes for the partial PDL data of the pages (for example, the first and second pages) in parentheses. Moreover, Supply (P1), Supply (P2), and the like indicate supplying partial print data of the pages in parentheses to the print execution unit 18.

(Case A: FIG. 6)

In Case A of FIG. 6, the target PDL data is six pages of PDF data. In the printer 10, since the RIP process for the partial PDL data (PDF) of the first and second pages has succeeded (step S34 of FIG. 3: YES), the controller 20 of the printer 10 sequentially supplies the partial print data of the first and second pages to the print execution unit 18 (step S46 for the case of "YES" in step S34 of FIG. 3). However, in the printer 10, the RIP process for the partial PDL data (PDF) of the third page fails (step S34 of FIG. 3: NO). Thus, the controller 20 sends the respective items of partial PDL data of the first to sixth pages to the server 60 (step S40 of FIG. 3). Subsequently, the controller 20 sends the page number information indicating the third page to the server 60 (step S42 of FIG. 3).

In the server 60, since the RIP process for the partial PDL data (PDF) of the third page has succeeded (step S120 of FIG. 5: YES), the server 60 sends the partial print data of the third page to the printer 10 (step S122 of FIG. 5).

The controller 20 supplies the partial print data of the third page received from the server 60 to the print execution unit 18 (step S46 for the case of "NO" in step S44 of FIG. 3). Subsequently, in the printer 10, since the RIP process for the partial PDL data (PDF) of the fourth page has succeeded (step S34 of FIG. 3: YES), the controller 20 supplies the partial print data of the fourth page to the print execution unit 18 (step S46 for the case of "YES" in step S34 of FIG. 3). However, in the printer 10, the RIP process for the partial PDL data (PDF) of the fifth page fails (step S34 of FIG. 3: NO). Thus, the controller 20 sends the page number information indicating the fifth page to the server 60 (step S42 of FIG. 3) without sending the partial PDL data to the server 60 (step S38 of FIG. 3: YES).

In the server 60, since the RIP process for the partial PDL data (PDF) of the fifth page has succeeded (step S120 of FIG. 5: YES), the server 60 sends the partial print data of the fifth page to the printer 10 (step S122 of FIG. 5).

The controller 20 supplies the partial print data of the fifth page received from the server 60 to the print execution unit 18 (step S46 for the case of "NO" in step S44 of FIG. 3). In the printer 10, since the RIP process for the partial PDL data (PDF) of the sixth page has succeeded (step S34 of FIG. 3: YES), the controller 20 supplies the partial print data of the sixth page to the print execution unit 18 (step S46 for the case of "YES" in step S34 of FIG. 3). Due to this, six pages of printing media on which images represented by the six pages of PDF data are printed can be appropriately provided to the user.

(Case B: FIG. 7)

In Case B of FIG. 7, the target PDL data is six pages of PCL data. In the printer 10, similarly to Case A of FIG. 6, the RIP process for the respective items of partial PDL data (PCL) of the first, second, fourth, and sixth pages succeeds, and the RIP process for the respective items of partial PDL data (PCL) of the third and fifth pages fails.

Unlike Case A, in Case B, when the RIP process for the partial PDL data (PCL) of the third page fails (step S74 of FIG. 4: NO), the controller 20 of the printer 10 sends only the partial PDL data (PCL) of the third page among the respective items of partial PDL data of the first to sixth pages to the server 60 (step S80 of FIG. 4). Similarly, when the RIP process for the partial PDL data (PCL) of the fifth page fails (step S74 of FIG. 4: NO), the controller 20 sends only the partial PDL data (PCL) of the fifth page to the server 60 (step S80 of FIG. 4). The other is the same as that of Case A. In Case B, six pages of printing media on which images represented by the six pages of PCL data are printed can be appropriately provided to the user.

Advantages of First Embodiment

As shown in Cases A and B of FIGS. 6 and 7, when the RIP process for the partial PDL data of the third page does not succeed after the RIP process for the partial PDL data of the first page has succeeded, that is, when the RIP process fails halfway, the controller 20 of the printer 10 sends at least the partial PDL data of the third page to the server 60 and receives the partial print data of the third page from the server 60. Moreover, the controller 20 supplies the partial print data of the third page to the print execution unit 18. As a result, the print execution unit 18 executes printing according to the partial print data of the third page. In this manner, when the RIP process fails halfway, the controller 20 can still cause the print execution unit 18 to appropriately execute printing.

Moreover, in Case A of FIG. 6, when the RIP process for the partial PDL data of the fifth page does not succeed, that is, when the RIP process again fails halfway, the controller 20 of the printer 10 sends the page number information that indicates the fifth page to the server 60 and receives the partial print data of the fifth page from the server 60. Moreover, the controller 20 supplies the partial print data of the fifth page to the print execution unit 18. Moreover, in Case B of FIG. 7, when the RIP process for the partial PDL data of the fifth page does not succeed, that is, the RIP process again fails halfway, the controller 20 of the printer 10 sends the partial PDL data of the fifth page and the page number information that indicates the fifth page to the server 60 and receives the partial print data of the fifth page from the server 60. Moreover, the controller 20 supplies the partial print data of the fifth page to the print execution unit 18. In Case B of FIG. 7 as well as in Case A of FIG. 6, the print execution unit 18 executes printing according to the partial print data of the fifth page. In this manner, when the RIP process fails halfway again, the controller 20 can still cause the print execution unit 18 to appropriately execute printing.

(Corresponding Relation)

The controller 20 of the printer 10 is an example of "control device." The RIP process executed by the printer 10 and the RIP process executed by the server 60 are examples of "first type of transformation process" and "second type of transformation process," respectively. For example, in Case A of FIG. 6, the following corresponding relations are obtained. That is, the target PDL data having the PDF data format, the six partial PDL data corresponding to six pages, and the six partial print data corresponding to six pages are examples of "target data," "plurality of partial target data," and "plurality of partial print data," respectively. The partial PDL data of the first page, the partial PDL data of the third page, the partial PDL data of the fifth page, and the respective items of partial PDL data of the fourth to sixth pages are examples of "first partial target data," "second partial target data," "third partial target data," and "one or more subsequent partial target data," respectively. The partial print data of the first page, the partial print data of the third page, and the partial print data of the fifth page are examples of "first partial print data," "second partial print data," and "third partial print data," respectively. The page number information that indicates the fifth page is an example of "specific information." Moreover, the partial print data of the third page and the partial print data of the fifth page are examples of "first transformed data" and "second trans-formed data," respectively. That is, in this embodiment, "first transformed data" and "second partial print data" are the same data. Moreover, "second transformed data" and "third partial print data" are the same data.

Second Embodiment

In this embodiment, the content of the PCL print process (step S18 of FIG. 2) of FIG. 4 is different from that of the first embodiment. In the first embodiment, in step S80, the sending unit 34 sends only the partial PDL data (PCL) of the N-th page to the server 60. In contrast, in this embodiment, when the RIP process fails first time (in step S74 of FIG. 4: NO), in step S80, the sending unit 34 sends the partial PDL data of the N-th to final pages to the server 60. After that, when the RIP process fails again (step S74 of FIG. 4: NO), the sending unit 34 proceeds to step S82 by skipping step S80.

Figure 8:
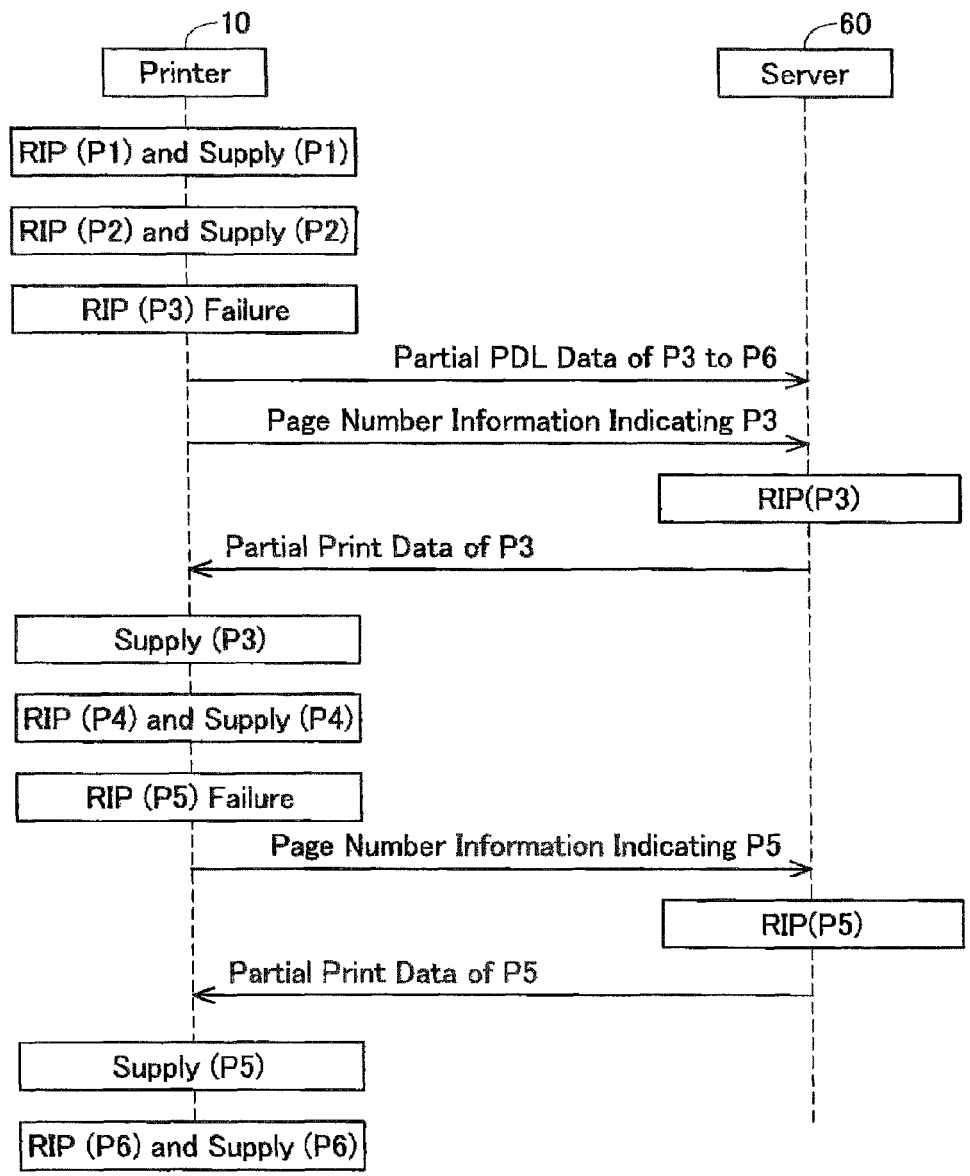
FIG. 8 shows a sequence diagram for Case C of a second embodiment.

As shown in Case C of FIG. 8, when the RIP process for the partial PDL data (PCL) of the third page fails (step S74 of FIG. 4: NO), the controller 20 of the printer 10 sends the respective items of partial PDL data of the third to sixth pages to the server 60 (step S80 of FIG. 4). However, when the RIP process for the partial PDL data (PCL) of the fifth page fails (step S74 of FIG. 4: NO), the controller 20 sends the page number information that indicates the fifth page to the server 60 (step S82 of FIG. 4) without sending the partial PDL data to the server 60 (by skipping step S80 of FIG. 4). The other is the same as that of the first embodiment.

In this embodiment, similarly to the first embodiment, when the RIP process fails halfway, the controller 20 of the printer 10 can still cause the print execution unit 18 to appropriately execute printing. Moreover, in this embodiment, when the RIP process fails several times, it is not necessary to send data having a relatively large size (that is, the partial PDL data of the N-th page) to the server 60 several times. Thus, in this embodiment, it is possible to reduce a processing load of the printer 10 and/or the server 60, required for sending and receiving the partial PDL data. In this embodiment, the respective items of partial PDL data of the fourth to sixth pages and the page number information that indicates the fifth page are examples of "one or more subsequent partial target data" and "specific information," respectively.

Third Embodiment

In this embodiment, the content of the PDF print process (step S16 of FIG. 2) of FIG. 3 is different from that of the first embodiment. In the first embodiment, in step S42, the sending unit 34 sends only the page number information that indicates the N-th page to the server 60. Thus, in step S46, the receiving unit 36 receives only the partial print data of the N-th page from the server 60. In contrast, in this embodiment, when the RIP process fails first time (step S34 of FIG. 3: NO), in step S42, the sending unit 34 sends the page number information that indicates all pages of the N-th to final pages to the server 60.

Upon receiving the page number information that indicates all pages of the N-th to final pages from the printer 10 (step S114 of FIG. 5: YES), in step S118, the controller 70 of the server 60 executes the RIP process for the partial PDL data (PDF) of the N-th to final pages to generate the partial print data of the N-th to final pages. Moreover, the controller 70 sends the partial print data of the N-th to final pages to the printer 10.

The receiving unit 36 of the printer 10 receives the partial print data of the N-th to final pages from the server 60 (step S44 of FIG. 3: NO). In this case, the supplying unit 40 sequentially supplies the partial print data of the N-th to final pages to the print execution unit 18 (step S46 of FIG. 3). When the supplying process is executed, the process of FIG. 3 ends after the processes of steps S54 and S56 are executed without executing the processes of steps S48 and S50 of FIG. 3.

Figure 9:
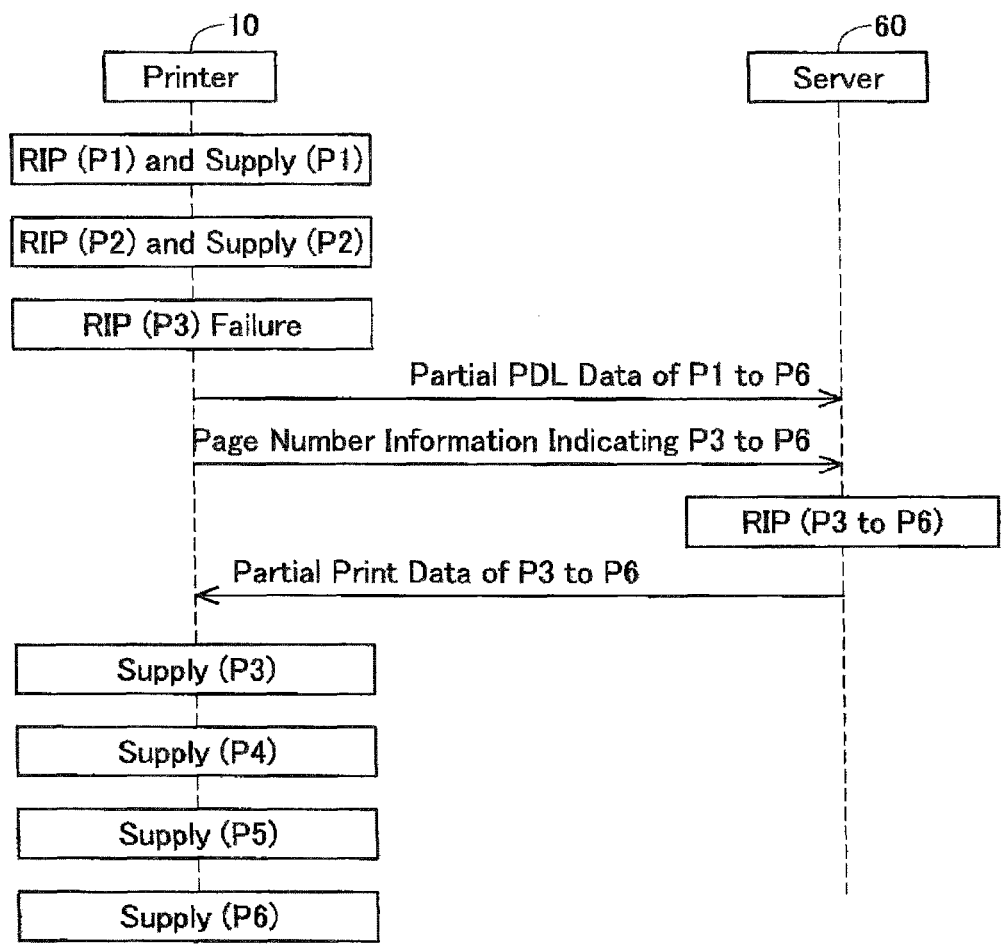
FIG. 9 shows a sequence diagram for Case D of a third embodiment.

As shown in Case D of FIG. 9, when the RIP process for the partial PDL data (PDF) of the third page fails (step S34 of FIG. 3: NO), the controller 20 of the printer 10 sends the respective items of partial PDL data (PDF) of the first to sixth pages to the server 60 (step S40 of FIG. 3) and sends the page number information that indicates all pages of the third to sixth pages to the server 60 (step S42 of FIG. 3). As a result, the controller 20 receives the respective items of partial print data of the third to sixth pages from the server 60 and sequentially supplies the respective items of partial print data of the third to sixth pages to the print execution unit 18 (step S46 of FIG. 3).

In this embodiment, similarly to the first embodiment, when the RIP process fails halfway, the controller 20 of the printer 10 can cause the print execution unit 18 to appropriately execute printing. Moreover, in this embodiment, the server 60 executes the RIP process for a page (hereinafter referred to as a "failed page") in which the RIP process of the printer 10 failed and pages subsequent to the failed page and sends the respective items of partial print data to the printer 10. The processing speed of the server 60 is generally faster than the processing speed of the printer 10. Thus, according to this embodiment, the controller 20 of the printer 10 can quickly supply the partial print data of the final page to the print execution unit 18 as compared to a configuration in which the printer 10 executes the RIP process for the pages subsequent to the failed page. That is, printing can be completed quickly. In this embodiment, the respective items of partial PDL data of the fourth to sixth pages and the respective items of partial print data of the fourth to sixth pages are examples of "one or more subsequent partial target data" and "one or more subsequent transformed data," respectively.

The PCL print process (step S18 of FIG. 2) of FIG. 4 may be executed in the above-described manner. That is, in step S80, the sending unit 34 sends the respective items of partial PDL data (PCL) of the N-th to final pages to the server 60. Then, in step S82, the sending unit 34 sends the page number information that indicates all pages of the N-th to final pages to the server 60. Moreover, the receiving unit 36 receives the respective items of partial print data of the N-th to final pages from the server 60 (step S84 of FIG. 4: NO). In this case, the supplying unit 40 sequentially supplies the respective items of partial print data of the N-th to final pages to the print execution unit 18 (step S86 of FIG. 4).

Fourth Embodiment

In this embodiment, the memory of the server 60 stores a transformation program for transforming PDL data having the PDF data format into PDL data having the PCL data format instead of the PDF RIP program.

In this embodiment, the content of the server process of FIG. 5 is different from that of the first embodiment. In the first embodiment, in step S118, the controller 70 of the server 60 executes the RIP process for the partial PDL data (PDF) of the N-th page to generate the partial print data. In this embodiment, instead of this, in step S118, the controller 70 of the server 60 transforms the partial PDL data (PDF) of the N-th page according to the transformation program to generate the partial PDL data (PCL) of the N-th page. In this example, in particular, the controller 70 generates partial PDL data that can be interpreted by the PCL RIP program having the program version "ver1.0" stored in the memory 24 of the printer 10. Moreover, in step S122, the controller 70 sends the partial PDL data (PCL) of the N-th page to the printer 10.

In this embodiment, the content of the PDF print process (step S16 of FIG. 2) of FIG. 3 is different from that of the first embodiment. That is, the receiving unit 36 of the printer 10 receives the partial PDL data (PCL) of the N-th page from the server 60 (step S44: NO). In this case, in a specific step (not shown), the transformation unit 32 executes the RIP process for the partial PDL data (PCL) of the N-th page according to the PCL RIP program having the program version "ver1.0" to generate the partial print data of the N-th page. Moreover, the supplying unit 40 supplies the partial print data of the N-th page to the print execution unit 18 (step S46).

Figure 10:
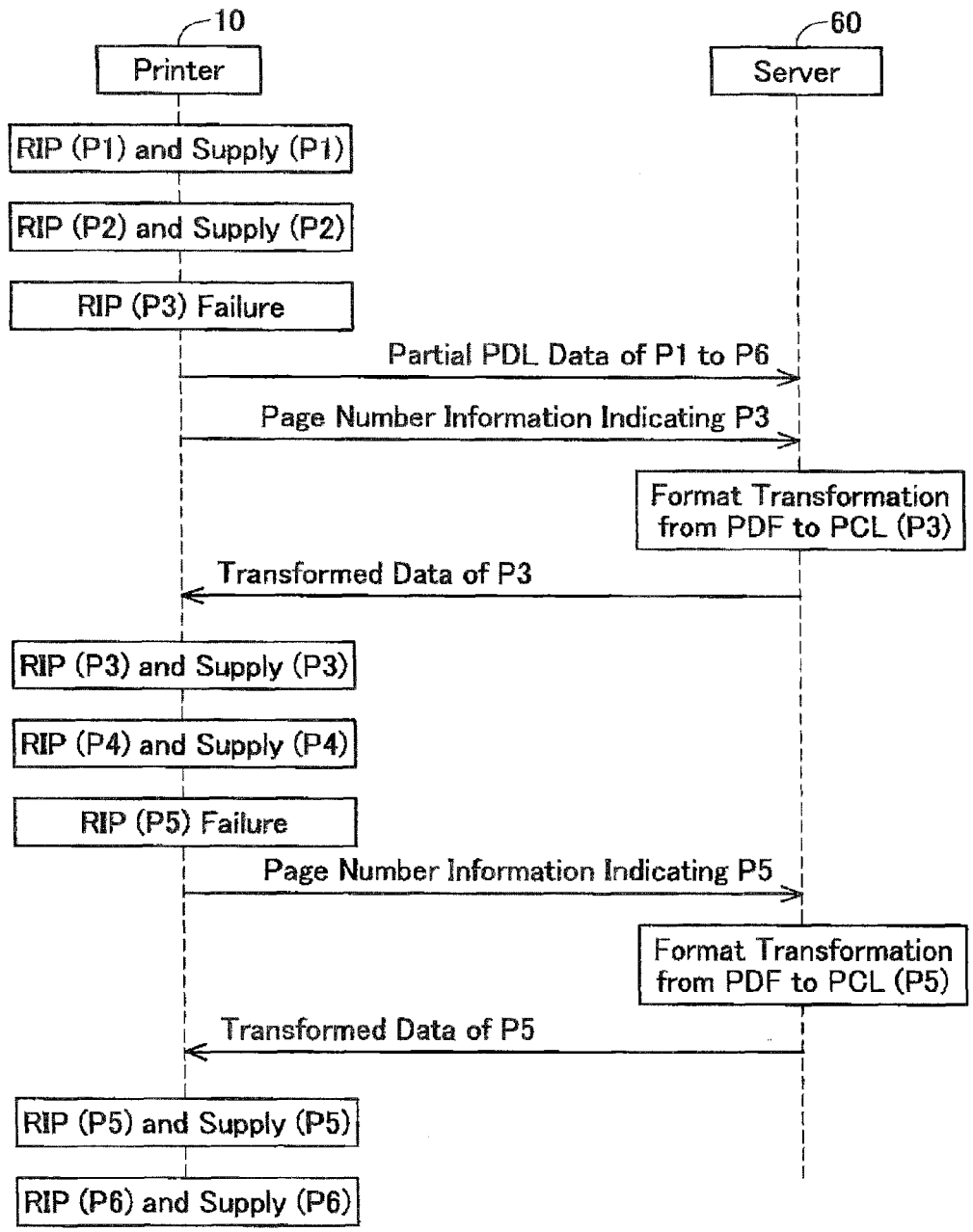
FIG. 10 shows a sequence diagram for Case E of a fourth embodiment.

As shown in Case E of FIG. 10, upon receiving the page number information that indicates the third page from the printer 10, the server 60 transforms the partial PDL data (PDF) of the third page to generate the partial PDL data (PCL) of the third page (in FIG. 10, the data is represented by "transformed data of P3") (step S118 of FIG. 5). The server 60 sends the partial PDL data (PCL) of the third page to the printer 10 (step S122 of FIG. 5).

Upon receiving the partial PDL data (PCL) of the third page from the server 60 (step S44 of FIG. 3: NO), the control unit 20 of the printer 10 executes the RIP process for the partial PDL data (PCL) of the third page to generate the partial print data of the third page (the specific step (not shown)). Subsequently, the controller 20 sequentially supplies the partial print data of the third page to the print execution unit 18 (step S46 of FIG. 3). The same process is executed when the RIP process for the partial PDL data of the fifth page fails.

In this embodiment, similarly to the first embodiment, when the RIP process fails halfway, the controller 20 of the printer 10 can still cause the print execution unit 18 to appropriately execute printing. In this embodiment, in Case E of FIG. 10, the RIP process in the printer 10, for the partial PDL data (PDF) of the third page, the PDF-PCL format transformation process in the server 60, and the RIP process in the printer 10, for the partial PDL data (PCL) of the third page are examples of "first type of transformation process," "second type of transformation process," and "third type of transformation process," respectively. The partial PDL data (PCL) of the third page and the partial PDL data (PCL) of the fifth page are examples of "first transformed data" and "second transformed data," respectively. Moreover, the partial print data of the third page and the partial print data of the fifth page are examples of "second partial print data" and "third partial print data," respectively. That is, in this embodiment, "first transformed data" and "second partial print data" are different data. Moreover, "second transformed data" and "third partial print data" are different data. Further, PDF and PCL are examples of "first page description language" and "second page description language," respectively.

The controller 70 of the server 60 may be configured to be capable of executing the PCL-PDF format transformation process in the above-described manner. That is, PCL and PDF may be examples of "first page description language" and "second page description language," respectively. Moreover, the combination of "first page description language" and "second page description language" is not limited to the combination of PCL and PDF and may include other combinations (for example, a combination of PDF and XPS, a combination of PCL and XPS, and a combination of XPS and PS).

Modifications of the above embodiment will be described below.

(First Modification)

In the above embodiments, the controller 20 of the printer 10 executes the RIP process to generate respective items of partial print data from respective items of partial PDL data. Instead of this, for example, the PC 50 may execute the respective processes (or the respective processes of the second to fourth embodiments) of FIGS. 2 to 4 according to a printer driver installed in the PC 50. That is, the PC 50 may include the preparation unit 30 and the supplying unit 40. In this case, the supplying unit 40 of the PC 50 may sequentially supply the respective items of partial print data to the printer 10. In this modification, the PC 50 and the printer 10 are examples of "control device" and "print execution unit," respectively.

(Second Modification)

In step S118 of FIG. 5, the controller 70 of the server 60 may execute the transformation process for the partial PDL data of the N-th page instead of executing the RIP process for the partial PDL data of the N-th page to generate multilevel bitmap data (for example, JPEG data). In this case, the receiving unit 36 of the printer 10 may receive the multilevel bitmap data from the server 60. Moreover, the transformation unit 32 may execute the transformation process for the multilevel bitmap data to generate the partial print data of the N-th page, and the supplying unit 40 may supply the partial print data of the N-th page to the print execution unit 18. The method of this modification may be used in the second to fourth embodiments. In this modification, the transformation process of transforming the partial PDL data into the multilevel bitmap data is an example of "second type of transformation process." Moreover, the multilevel bitmap data is an example of "first transformed data," "second transformed data," and "one or more subsequent transformed data."

(Third Modification)

In step S118 of FIG. 5, the controller 70 of the server 60 may execute the following process instead of executing the RIP process for the partial PDL data of the N-th page. For example, the partial PDL data of the N-th page has the PDF data format and includes the unsupported command (for example, a rendering command for transparency processing and the like). In this case, the controller 70 of the server 60 may generate new partial PDL data (PDF) of the N-th page by changing the unsupported command into a command that is supported by the PDF RIP program having the program version "ver1.3" stored in the memory 24 of the printer 10. In this case, the receiving unit 36 of the printer 10 may receive the new partial PDL data (PDF) of the N-th page from the server 60. Moreover, the transformation unit 32 may execute the RIP process for the new partial PDL data (PDF) of the N-th page according to the PDF RIP program having the program version "ver1.3" to generate the partial print data of the N-th page, and the supplying unit 40 may supply the partial print data of the N-th page to the print execution unit 18. The method of this modification may be used in the second to fourth embodiments. In this modification, the process of changing the unsupported command is an example of "second type of transformation process." Moreover, the new partial PDL data (PDF) is an example of "first transformed data," "second transformed data," and "one or more subsequent transformed data."

(Fourth Modification)

In the above embodiments, for example, in step S42 of FIG. 3, the sending unit 34 sends the page number information that indicates the N-th page to the server 60. Instead of this, for example, when an ID different from the page number is allocated to each partial PDL data, the sending unit 34 may send an ID for identifying the partial PDL data of the N-th page to the server 60. In this embodiment, the ID is an example of "specific information."

(Fifth Modification)

In the above embodiments, the respective units 30 to 40 are realized when the CPU 22 executes software. Instead of this, at least one of the respective units 30 to 40 may be realized by hardware such as a logical circuit.

What is clamed is:

1. A control device for causing a print execution unit to execute printing, the control device comprising:
   a processor; and
   a memory storing computer-readable instructions therein that, when executed by the processor, cause the control device to perform:
   preparing a plurality of partial print data by using target data, the plurality of partial print data corresponding to a plurality of pages, the target data including a plurality of partial target data corresponding to the plurality of pages; and
   supplying each of the plurality of partial print data sequentially to the print execution unit,
   wherein the preparing includes:
     executing a first type of transformation process for each of the plurality of partial target data sequentially, so as to try to generate each of the plurality of partial print data sequentially;
     sending second partial target data to a server via a network, in a first case where the first type of transformation process for the second partial target data does not succeed after the first type of transformation process for first partial target data succeeded and first partial print data was generated, the first partial target data being data for which the first type of transformation process is to be executed firstly among the plurality of partial target data, the second partial target data being data for which the first type of transformation process is to be executed after the first partial target data among the plurality of partial target data; and
     receiving first transformed data from the server via the network in the first case, the first transformed data being data generated by the server executing a second type of transformation process for the second partial target data;
   wherein the supplying includes supplying second partial print data to the print execution unit in the first case, the second partial print data being data obtained by using the first transformed data.

2. The control device as in claim 1, wherein
   the executing includes executing the first type of transformation process for third partial target data in the first case, so as to try to generate third partial print data, the third partial target data being data for which the first type of transformation process is to be executed after the second partial target data among the plurality of partial target data.

3. The control device as in claim 2, wherein
   the sending includes sending the second partial target data and one or more subsequent partial target data to the server via the network in the first case, the one or more subsequent partial target data being all of partial target data for which the first type of transformation process is to be executed after the second partial target data among the plurality of partial target data,
   the sending further includes sending specific information for specifying the third partial target data to the server via the network, without sending the third partial target data to the server, in a second case where the first type of transformation process for the third partial target data does not succeed, the receiving further includes receiving second transformed data from the server via the network in the second case, the second transformed data being data generated by the server executing the second type of transformation process for the third partial target data specified by the specific information among the one or more subsequent partial target data, and the supplying includes supplying the third partial print data to the print execution unit in the second case, the third partial print data being data obtained by using the second transformed data.

4. The control device as in claim 1, wherein the sending includes sending the second partial target data and one or more subsequent partial target data to the server via the network in the first case, the one or more subsequent partial target data being all of partial target data for which the first type of transformation process is to be executed after the second partial target data among the plurality of partial target data, the receiving includes receiving the first transformed data and one or more subsequent transformed data from the server via the network in the first case, the one or more subsequent transformed data being data generated by the server executing the second type of transformation process for the one or more subsequent partial target data, the supplying includes supplying each of the second partial print data and one or more subsequent partial print data sequentially to the print execution unit in the first case, the one or more subsequent partial print data being data obtained by using the one or more subsequent transformed data.

5. The control device as in claim 1, wherein the sending includes sending all of the plurality of partial target data to the server via the network in the first case.

6. The control device as in claim 1, wherein the preparing further includes:

determining configured to determine whether it is capable of identifying a data format of the target data, wherein the preparing includes preparing the first partial print data in a case where it is determined that it is capable of identifying the data format of the target data.

7. The control device as in claim 1, wherein the first transformed data is the second partial print data.

8. The control device as in claim 1, wherein the target data has a data format described in a first page description language, the first transformed data has a data format described in a second page description language different from the first page description language, and the executing further includes executing a third type of transformation process for the first transformed data in the first case, so as to generate the second partial print data.

9. A non-transitory computer-readable storage medium storing computer-readable instructions for a control device for causing a print execution unit to execute printing, the computer-readable instructions, when executed by a processor of the control device, cause the control device to perform:

preparing a plurality of partial print data by using target data, the plurality of partial target data corresponding to a plurality of pages, the target data including a plurality of partial target data corresponding to the plurality of pages; and supplying each of the plurality of partial print data sequentially to the print execution unit, wherein the above preparing includes:

executing a first type of transformation process for each of the plurality of partial target data sequentially, so as to try to generate each of the plurality of partial print data sequentially;

sending second partial target data to a server via a network, in a first case where the first type of transformation process for the second partial target data does not succeed after the first type of transformation process for first partial target data succeeded and first partial print data was generated, the first partial target data being data for which the first type of transformation process is to be executed firstly among the plurality of partial target data, the second partial target data being data for which the first type of transformation process is to be executed after the first partial target data among the plurality of partial target data; and receiving first transformed data from the server via the network in the first case, the first transformed data being data generated by the server executing a second type of transformation process for the second partial target data;

wherein supplying the includes supplying second partial print data to the print execution unit in the first case, the second partial print data being data obtained by using the first transformed data.

* * * * *